US008374652B2

(12) United States Patent
Tzoreff et al.

(10) Patent No.: US 8,374,652 B2
(45) Date of Patent: Feb. 12, 2013

(54) METHOD AND SYSTEM FOR EARLY TERMINATION OF RECEIVE CORRELATION WINDOW FOR BLUETOOTH COMMUNICATION

(75) Inventors: Yaniv Tzoreff, Jerusalem (IL); Ronen Isaac, Tel Aviv (IL); Ran Katz, Givataim (IL); Matan Ben-Shachar, Korazim (IL)

(73) Assignee: Texas Instruments Incorporated, Dallas, TX (US)

( * ) Notice: Subject to any disclaimer, the term of this patent is extended or adjusted under 35 U.S.C. 154(b) by 120 days.

(21) Appl. No.: 12/932,224

(22) Filed: Feb. 18, 2011

(65) Prior Publication Data

US 2012/0214410 A1 Aug. 23, 2012

(51) Int. Cl.
*H04M 1/00* (2006.01)
*H04B 1/38* (2006.01)

(52) U.S. Cl. .... 455/574; 455/572; 455/41.2; 455/67.11; 455/67.13; 455/67.15; 455/343.1; 455/343.2; 455/343.4; 370/311; 370/445

(58) Field of Classification Search .................. 455/572, 455/574, 41.2, 67.11, 67.13, 67.15, 343.1, 455/343.2, 343.4; 370/311, 445
See application file for complete search history.

(56) References Cited

U.S. PATENT DOCUMENTS

| 6,876,643 | B1 * | 4/2005 | Aggarwal et al. ............. 370/338 |
| 7,020,467 | B2 * | 3/2006 | Tada .............................. 455/434 |
| 7,475,244 | B2 * | 1/2009 | Sugikawa ..................... 713/168 |
| 8,150,322 | B2 * | 4/2012 | Lin ............................. 455/41.2 |
| 8,194,557 | B2 * | 6/2012 | Sasai et al. .................... 370/252 |
| 2005/0220221 | A1 * | 10/2005 | Grignani et al. .............. 375/316 |
| 2009/0147829 | A1 * | 6/2009 | Zhodzishsky et al. ........ 375/134 |
| 2010/0120363 | A1 * | 5/2010 | Lin ............................. 455/41.2 |
| 2011/0028093 | A1 * | 2/2011 | Patel et al. .................... 455/41.2 |
| 2011/0063103 | A1 * | 3/2011 | Lee et al. ..................... 340/505 |

\* cited by examiner

*Primary Examiner* — Tuan A Tran
(74) *Attorney, Agent, or Firm* — Ronald O. Neerings; Wade James Brady, III; Frederick J. Telecky, Jr.

(57) ABSTRACT

A system for terminating a receive correlation window of a receiving wireless device includes a radio frequency receiver configured to open a receive correlation window having a predetermined duration and an energy measurement circuit configured to measure a radio frequency energy level ambient to the wireless receiver. A comparator is included that is configured to determine, based on the measured radio frequency energy level, whether or not a signal is being transmitted from a nearby wireless device. The receiver is further configured to close the receive correlation window before the predetermined duration is reached in response to a determination by the comparator that no signal is being transmitted by a nearby device. If a signal is being transmitted, then the receive correlation window is allowed to proceed uninterrupted.

20 Claims, 2 Drawing Sheets

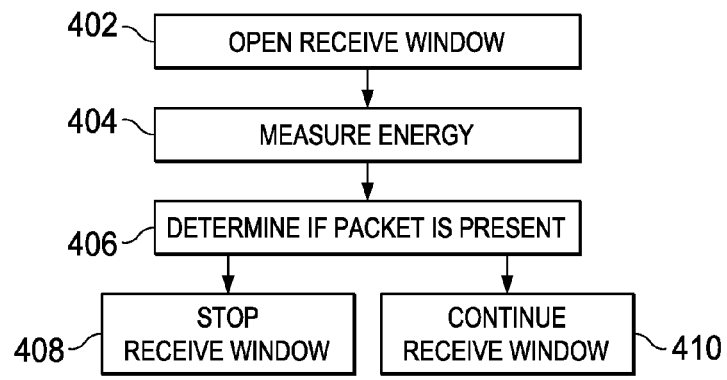
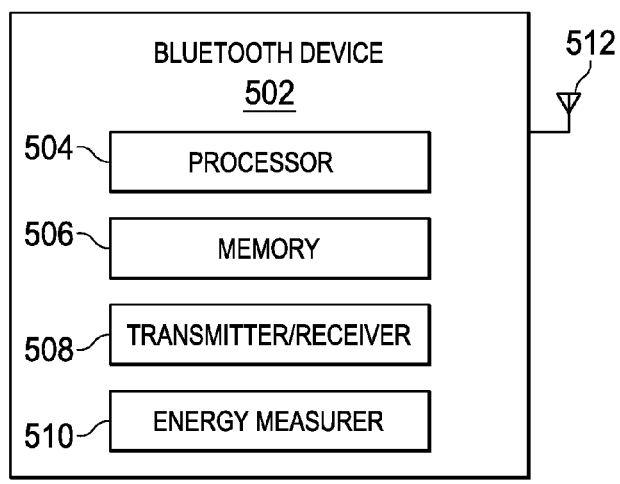

METHOD AND SYSTEM FOR EARLY TERMINATION OF RECEIVE CORRELATION WINDOW FOR BLUETOOTH COMMUNICATION

BACKGROUND

1. Field

The present invention relates generally to near field communication and, more particularly, to power saving within such an environment.

2. Description of Related Art

Bluetooth technology is a short-range wireless communications technology to replace the cables connecting electronic devices, allowing a person for example to have a phone conversation via a headset, use a wireless mouse and synchronize information from a mobile phone to a PC, all using the same core system.

The Bluetooth RF transceiver (or physical layer) operates in the unlicensed ISM band centered at 2.4 gigahertz which is the same range of frequencies used by microwaves and Wi-Fi. The core system employs a frequency-hopping transceiver to combat interference and fading.

Bluetooth devices are typically managed using an RF topology known as a "star topology." A group of devices synchronized in this fashion forms a piconet, which may contain one master and up to seven active slaves, with additional slaves that are not actively participating in the network. Also a given device may also be part of one or more piconets, either as a master or as a slave. In a piconet, the physical radio channel is shared by a group of devices that are synchronized to a common clock and frequency-hopping pattern, with the master device providing the synchronization references. Additionally, Bluetooth devices can be arranged in a peer-to-peer network or mesh configuration as well.

One shortcoming, however, is that in both master and slaver modes, Bluetooth devices frequently open a receive correlation window to detect potential transmissions from a peer device. Detection is accomplished using a relatively long correlation sequence (e.g., 68 bits or 68 µs) even if no device is actively transmitting. Thus, the correlation window is open for the entire period consuming significant amounts of current.

BRIEF SUMMARY

Embodiments of the present invention relate to a system and method for terminating a receive correlation window of a receiving wireless device that includes a radio frequency receiver configured to open a receive correlation window having a predetermined duration and an energy measurement circuit configured to measure a radio frequency energy level ambient to the wireless receiver. A comparator is included that is configured to determine, based on the measured radio frequency energy level, whether or not a signal is being transmitted from a nearby wireless device. The receiver is further configured to close the receive correlation window before the predetermined duration is reached in response to a determination by the comparator that no signal is being transmitted by a nearby device. If a signal is being transmitted, then the receive correlation window is allowed to proceed uninterrupted.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF DRAWINGS

Various aspects of embodiments of the invention are illustrated by way of example, and not by way of limitation, in the accompanying drawings, wherein:

FIG. 4 depicts a flowchart of an exemplary method of terminating a receive correlation window in accordance with the principles of the present invention.

FIG. 5 depicts an exemplary Bluetooth device in accordance with the principles of the present invention.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Figure 1:
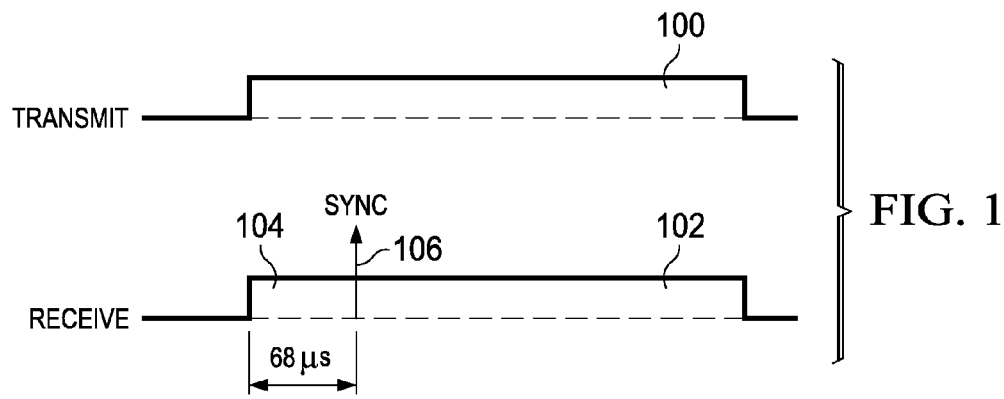
FIG. 1 depicts a graph of a transmitted signal and a received signal in which synchronization occurs at the receiver.

FIG. 1 depicts a graph of a transmitted signal and a received signal in which synchronization occurs at the receiver. The graph shows a transmitted signal 100 that is being sent from one device. At a receiving device, a receive correlation window 104 has been opened to determine whether a device is transmitting a signal 100 that is to be received. Because the signal 100 is being transmitted a correlation sequence is detected during the window 104 that results in synchronization 106 of the receiver to the transmitted signal 100. Once synchronization 106 occurs, then the remaining received signal 102 is processed by a Bluetooth device as understood by one of ordinary skill.

Figure 2:
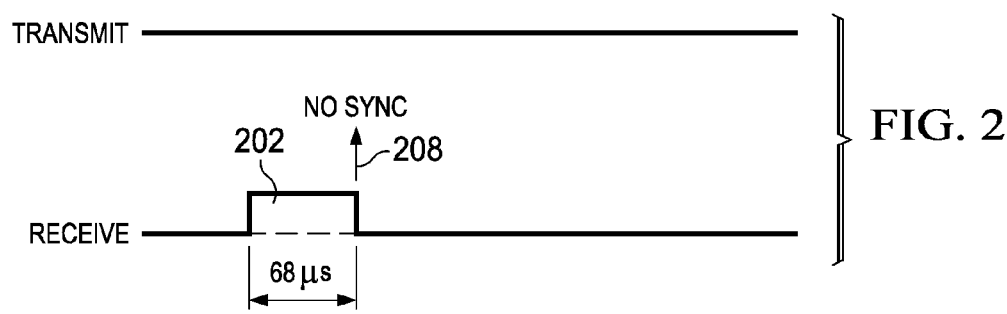
FIG. 2 depicts a graph of an open receive correlation window in which no synchronization occurs.

FIG. 2 depicts a graph of an open receive correlation window in which no synchronization occurs. In FIG. 1, the correlation window 104 lasts for about 68 µs because of the structure of Bluetooth packets. However, in instances, as shown in FIG. 2, where no signal is being transmitted, the receiver still opens a receive correlation window 202 to determine if any device is transmitting. With no signal being transmitted, the receiver does not synchronize 208 with a transmitted signal and the correlation window 202 is closed. However, in both instances of FIG. 1 and FIG. 2, the receive correlation window lasts for about 68 µs. In the second case, depicted in FIG. 2, this relatively long correlation window is in vain and results in consumption of power for the entire 68 µs.

Figure 3:
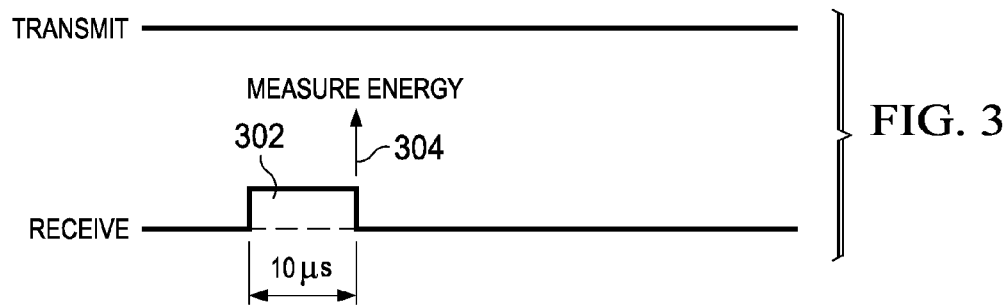
FIG. 3 depicts a graph early termination of a receive correlation window in accordance with the principles of the present invention.

FIG. 3 depicts a graph early termination of a receive correlation window in accordance with the principles of the present invention. The PHY layer of a Bluetooth device is equipped to sense energy levels in the appropriate transmission frequencies. For example, the PHY layer can implement a Carrier-Sense algorithm to determine if a channel is occupied in order to determine whether or not transmission of a signal can occur. Using similar capability, the PHY layer can sense the presence or absence of a particular energy level in order to determine whether or not a transmitting device is currently transmitting a signal.

FIG. 3 depicts an instance in which there is no signal being transmitted. At the receiver, the receive correlation window 302 is opened as previously described but an initial energy measurement 304 is performed quickly to determine if a peer device is currently transmitting a signal. When the energy measurement indicates that no signal is being transmitted, then the receiver closes the correlation window instead of keeping it open for the full 68 µs. If the energy measurement indicated a signal was being transmitted, then the correlation, synchronization, and receiving of the transmitted signal; would have been allowed to proceed as depicted in FIG. 1. While the amount of time that is used to measure for the energy of a transmitted signal may vary, around 8 µs is sufficient to accurately detect most instances when a transmitted signal is present. As for specific energy levels, some variance is permitted but an RF energy level (mW/g) near zero will indicate the absence of a transmitted signal.

FIG. 4 depicts a flowchart of an exemplary method of terminating a receive correlation window in accordance with the principles of the present invention. At step 402, a Bluetooth receiving device opens a receive correlation window. Shortly thereafter (e.g., about 8 µs) an RF energy level is measured, in step 404. Based on the energy level measured, or the absence of any energy being detected, it is determined, in step 406, whether there is a packet or signal presently being transmitted which is available to the receiver. Based on the determination, one of two options are selected. If no signal is being transmitted, then the receiver closes the receive correlation window, in step 408. If, however, there is a signal being transmitted, then the receiver continues with the receive correlation window.

FIG. 5 depicts an exemplary Bluetooth device in accordance with the principles of the present invention. The figure shows an overview of a device 502 in schematic form. The device 502 typically will include a processor 504 and memory 506 that can execute various software routines for transmitting, receiving, and processing information exchanged with other devices. The device 502 also includes an antenna 512, feeding RF transmit/receive part 508. This part 508 converts RF to IF signals which can be analog or digital and are typically I and Q signals. It also controls how to look for different RF frequencies according to a channel hop sequence. Hence a frequency hop control part can be part of the RF transmit/receive part 508. The transmit/receive part 508 handles the sync sequence correlation of the received signals and synchronizes various processes by determine a timing of a received packet to start demodulation and to enable the header to be decoded and used for maintaining a predetermined frequency hop cycle.

The received signal and a timing offset from the correlation signals are fed to a demodulator which outputs baseband digital signals that include the information being exchanged between devices. A wide range of processing functions of low level Bluetooth protocol layers can be involved, leading to data output at an interface for use by applications. The processor 504 can be used for coordination of the various parts and to store parameters such as expected access codes or sync sequences used for correlation. The different functions can be segmented or integrated differently. Many other functions not shown can be included. The receiver can be for a Bluetooth link or network, or for other packet based protocols.

The Bluetooth enabled device 502 may transmit and receive Bluetooth packets, for example, at around the 2.4 GHz Industrial, Scientific and Medical (ISM) frequency band. The device 502 may transmit and receive Bluetooth packets using a frequency hopping scheme to reduce interference and fading. In one example, the device 502 may use a scheme comprising 79 or fewer different hop frequencies spaced 1 MHz apart within a frequency range of 2.402 to 2.480 GHz. Each hop frequency may be referred to as a channel with 79 different channels in the example given above. These are merely examples, and the subject technology is not limited to these examples.

Of particular interest to embodiments of the present invention the PHY layer of the RF transmit/receive part 508 includes energy measurement circuitry 510. This circuitry 510, as described above, is used to detect an energy level that is present near the start of a receive correlation window. In particular, the ambient energy level nearby the device 502 is what is of interest. This ambient energy level reflects the transmission of signals from other Bluetooth devices that are close enough to exchange information with the device 502. If the energy measurement circuitry 510 does not detect an energy level commensurate with a signal being transmitted, then the receive correlation window is closed instead of allowing it to continue for its full length. Thus, the energy measurement circuitry 510 includes a comparator that compares the measured radio frequency energy level with a predetermined threshold. If the measured energy level exceeds the threshold, then a signal is being transmitted by a nearby device. If, however, the measured energy level is below that threshold, then it is determined that no nearby device is transmitting a signal and the receive correlation window can be closed prematurely.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with each claim's language, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. Also, the term "exemplary" is meant to indicate that some information is being provided as an example only as is not intended to mean that that information is somehow special or preferred. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for terminating a receive correlation window of a wireless receiver, comprising:
opening a receive correlation window having a predetermined duration;
measuring a radio frequency energy level available to the wireless receiver;

determining, based on the measured radio frequency energy level, whether or not a signal is being transmitted from a wireless device; and in response to determining the signal is not being transmitted, closing the receive correlation window before the predetermined duration is reached.

2. The method of claim 1, wherein the predetermined duration is about 68 µs.

3. The method of claim 1, wherein the radio frequency energy level is measured at a frequency of about 2.4 GHz.

4. The method of claim 1, wherein closing the receive correlation window occurs at about 8 µs after opening the receive correlation window.

5. The method of claim 1, further comprising:
in response to determining the signal is being transmitted, allowing the correlation window to be open for the predetermined duration.

6. The method of claim 1, wherein the wireless receiver is a Bluetooth device.

7. The method of claim 1, wherein the wireless device is a Bluetooth device.

8. The method of claim 1, wherein the wireless receiver and the wireless device are members of a Bluetooth peer-to-peer communication network.

9. The method of claim 8, wherein the wireless receiver is in slave mode.

10. The method of claim 8, wherein the wireless receiver is in master mode.

11. A system for terminating a receive correlation window of a first wireless device, comprising:
a radio frequency receiver configured to open a receive correlation window having a predetermined duration;
an energy measurement circuit configured to measure a radio frequency energy level ambient to the wireless receiver;
a comparator configured to determine, based on the measured radio frequency energy level, whether or not a signal is being transmitted from a second wireless device; and
the receiver further configured to close the receive correlation window before the predetermined duration is reached in response to a determination by the comparator that the signal is not being transmitted.

12. The system of claim 11, wherein the predetermined duration is about 68 µs.

13. The system of claim 11, wherein the radio frequency energy level is measured at a frequency of about 2.4 GHz.

14. The system of claim 11, wherein the receiver is configured to close the receive correlation window at about 8 µs after opening the receive correlation window.

15. The system of claim 11, wherein the receiver is further configured to:
allow the correlation window to be open for the predetermined duration, in response to a determination that the signal is being transmitted.

16. The system of claim 11, wherein the first wireless device is a Bluetooth device.

17. The system of claim 11, wherein the second wireless device is a Bluetooth device.

18. The system of claim 11, wherein the first and second wireless devices are members of a Bluetooth peer-to-peer communication network.

19. The system of claim 18, wherein the first wireless device is configured to operate in slave mode.

20. The system of claim 18, wherein the first wireless device is configured to operate in master mode.

* * * * *